United States Patent
Watanabe

(10) Patent No.: US 6,692,812 B1
(45) Date of Patent: Feb. 17, 2004

(54) MULTILAYER SHEET STRUCTURE AND PRODUCTION METHOD THEREOF

(75) Inventor: Kazue Watanabe, c/o Denenchofu Roman Co., Ltd., 2-48-16, Denenchofu, Ota-ku, Tokyo 145-0071 (JP)

(73) Assignee: Kazue Watanabe, Tokyo (JP)

( * ) Notice: Subject to any disclaimer, the term of this patent is extended or adjusted under 35 U.S.C. 154(b) by 0 days.

(21) Appl. No.: 09/926,090

(22) PCT Filed: Dec. 28, 1999

(86) PCT No.: PCT/JP99/07399

§ 371 (c)(1),
(2), (4) Date: Nov. 20, 2001

(87) PCT Pub. No.: WO01/48305

PCT Pub. Date: Jul. 5, 2001

(51) Int. Cl.[7] .................................................. B32B 5/24
(52) U.S. Cl. ................... 428/138; 5/702; 5/709; 5/738; 5/740; 53/452; 53/467; 428/68; 428/71; 428/72; 428/76; 428/137; 428/158; 441/102; 441/127
(58) Field of Search .......................... 428/40.1, 40.2, 428/41.6, 41.7, 41.8, 42.1, 68, 71, 72, 137, 138, 158, 76; 5/702, 709, 738, 740; 441/102, 127; 53/452, 467

(56) References Cited

U.S. PATENT DOCUMENTS 3,629,034 A * 12/1971 Kuroda ........................ 156/219
6,235,661 B1 * 5/2001 Khanamirian ............... 428/218

FOREIGN PATENT DOCUMENTS

| JP | 57-56506 | 4/1982 |
| JP | 59-12898 | 1/1984 |

* cited by examiner

*Primary Examiner*—Nasser Ahmad
(74) *Attorney, Agent, or Firm*—Oblon, Spivak, McClelland, Maier & Neustadt, P.C.

(57) ABSTRACT

A multilayer sheet structure (10) comprises a front sheet (11), a net-like backing sheet (12), and sewing threads (14) for partially joining the front sheet with the backing sheet so as to form bag portions (13) between the front and backing sheets. Paddings (15) such as cotton, wool or the like can be stuffed through net clearances of the backing sheet into bag portions surrounded with sewing threads to form bulges (11b) at desired locations on the front surface of the front sheet. Thus, a quilted multilayer sheet structure (17) having bulges on the front surface thereof can be easily produced.

15 Claims, 8 Drawing Sheets

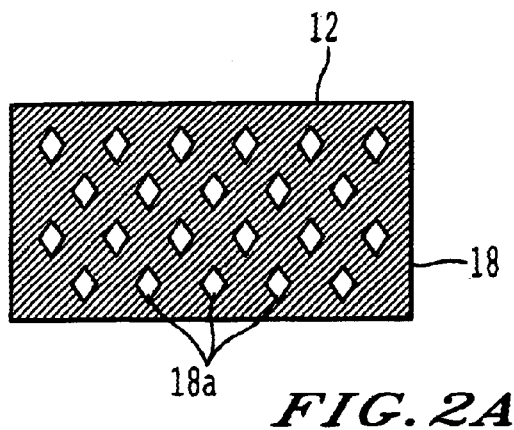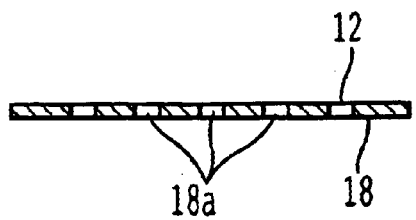
*FIG. 2A*  *FIG. 2B*
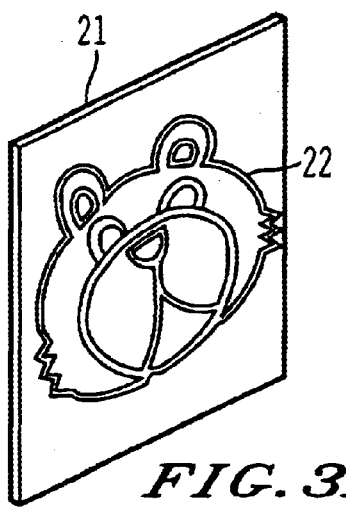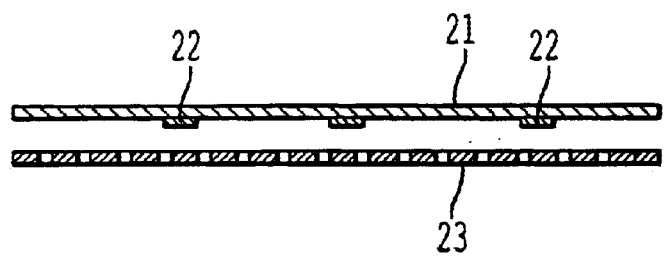
*FIG. 3A*
*FIG. 3B*
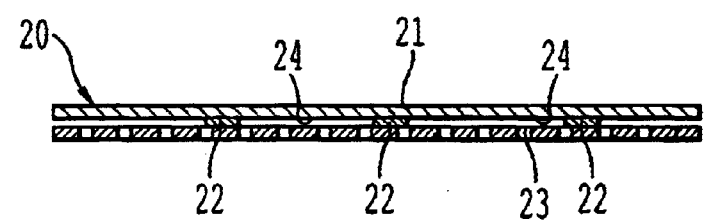
*FIG. 3C*
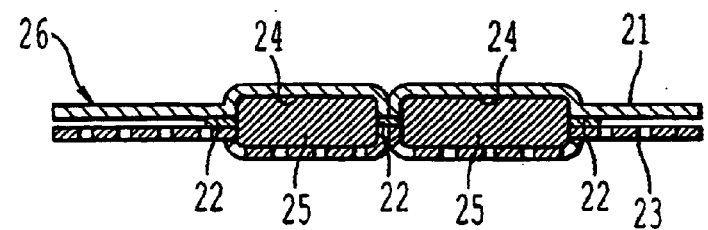
*FIG. 3D*

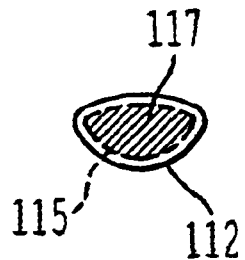
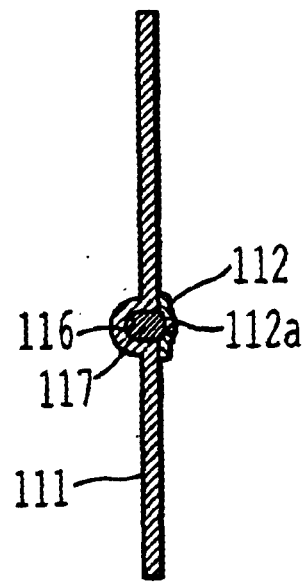
FIG. 10A
FIG. 10B
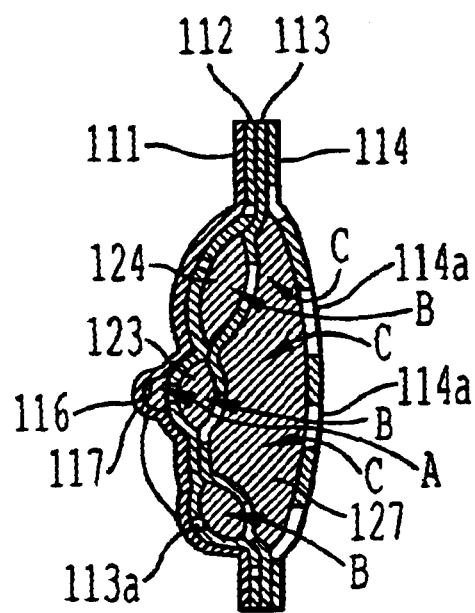
FIG. 11

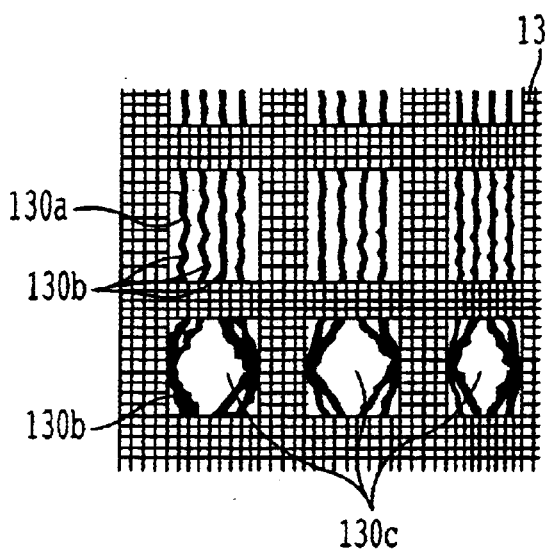
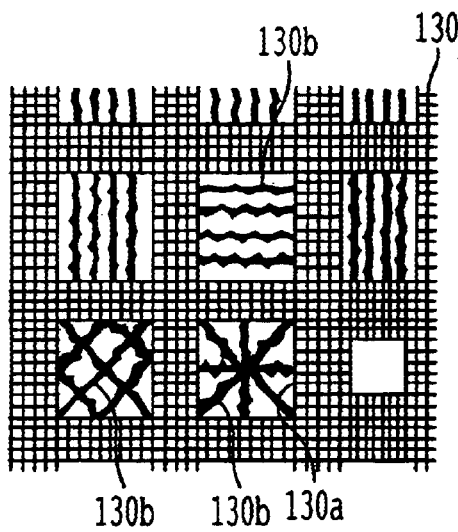
*FIG. 12A*  *FIG. 12B*
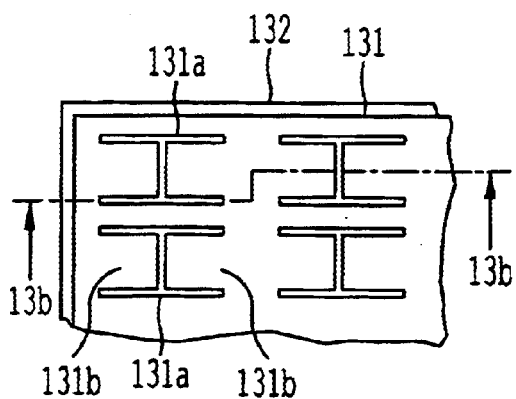
*FIG. 13A*
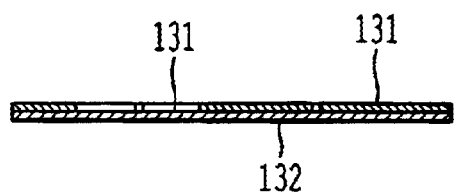
*FIG. 13B*
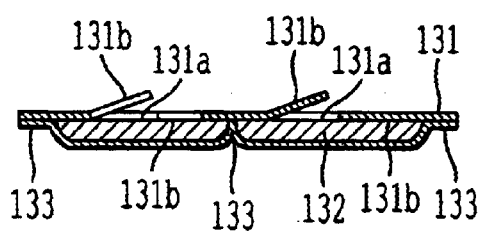
*FIG. 13C*
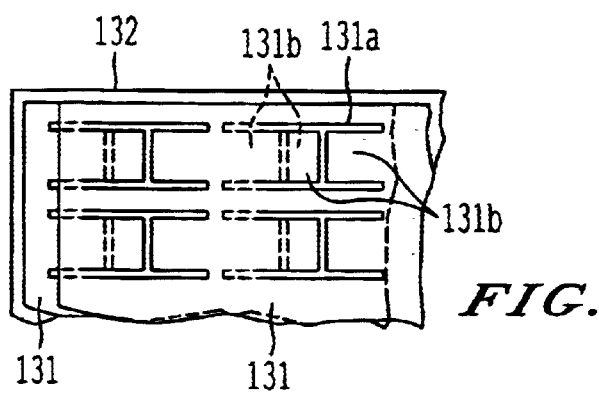
*FIG. 14*

MULTILAYER SHEET STRUCTURE AND PRODUCTION METHOD THEREOF

TECHNICAL FIELD

The present invention relates to a multilayer sheet structure and production method thereof. More particularly, the present invention relates to a multilayer sheet structure wherein bulges can easily be formed on the front surface thereof. The invention further relates to a multilayer sheet structure wherein bulges are formed on the front surface thereof and a production method thereof. The invention further relates to a backing sheet structure and a front sheet structure which make it possible to easily produce a multilayer structure.

BACKGROUND ART

Conventionally, a quilt wherein paddings made of cotton, wool, or the like are inserted entirely between a front sheet and a backing sheet before embroidering has been widely used. On the other hand, a method of locally inserting pieces of cotton between a front sheet and a backing sheet and embroidering the surrounding of the cotton pieces is a popular method of forming a partial bulge on a surface of cloth. Further, there has been also known a method for forming bulges on the front surface of a front sheet wherein bag portions are formed beforehand by sewing in pattern a front sheet and a backing sheet together and then rifts are made by a pair of scissors on the backing sheet corresponding to the locations of the bag portions, and wherein cotton paddings or the like are then stuffed into the bag portions through the rifts and the rifts are then sewed with threads. Such a multilayer sheet structure is applied widely to personal belongings made of cloth such as clothes, towels, and handkerchiefs, cushions, bed covers, table cloths, cloth tapestries, bags, and stuffed toys.

However, the aforementioned quilt generally comprises quilt paddings inserted entirely between the front sheet and the backing sheet and only one portion of the surface of the cloth therefore cannot be bulged. Further, in the aforementioned quilt or method of forming bulges, once the front and backing sheets are or the rift on the backing sheet is sewed with threads, the cotton paddings or the like between the front sheet and the backing sheet are shut in the bag portions and it is therefore difficult to change locations where the bulges are formed or correct the height of bulges.

Further, according to the aforementioned quilt or method for forming the bulges, the joined parts (sewed together part) forming the bag portions between the two sheets (front and backing sheets) are only flatly disposed and formed on a plane, and the bulges formed on the front or rear surface are therefore also flatly disposed and, as a result, highly cubic bulge patterns cannot be formed.

Accordingly, an object of the present invention is to provide a multilayer sheet structure and a method of producing thereof which make it possible to easily form a bulge at a desired location on a front surface and which, if necessary, also make it easy to change a location at which a bulge is formed and to correct a height of a bulge.

Another object of the present invention is to provide a multilayer sheet structure having bulges on a front surface thereof and, if necessary capable of easily changing a location at which each bulge is formed and correcting a height of bulges.

DISCLOSURE OF THE INVENTION

The present invention provides a multilayer sheet structure comprising a front sheet, a net-like backing sheet, and a joining means for partially joining the front sheet and the backing sheet to form bag portions between the front sheet and the backing sheet.

In the muitilayer sheet structure having the above configuration, it is possible to form bulges at desired locations on the surface of the front sheet by stuffing cotton or wool paddings through net clearances of the net-like backing sheet into bag portions surrounded by the joining means. In addition, since the stuffing can easily be inserted into the bag portions through net clearances of the net-like backing sheet, a trouble of making rifts on the backing sheet can be omitted. Further, even when a pattern created by the joining means has a complicated shape, a bulge of a desired shape can easily be formed on the front sheet by stuffing an appropriate amount of paddings from a net clearances at a desired location in accordance with the shape of the bag portion. Further, since the paddings stuffed into the bag portion from the net clearances can easily be taken out, a location at which a bulge is formed can easily be changed and a height of a bulge can easily be corrected. Accordingly, even a person unskilled in the art can easily create a quilt product having bulges on the surface thereof. Further, a person skilled in the art can efficiently and easily create a quilt product having complicated patterns thereon.

Further, the present invention provides a multilayer sheet structure comprising paddings stuffed in bag portions between the front sheet and the backing sheet.

In the multilayer sheet structure having the above configuration, since it is possible to supplement paddings into a bag portion between the front sheet and the backing sheet through net clearances of the net-like backing sheet and pull out the same from the bag portion if necessary, it is possible to easily change a location at which a bulge is formed and to easily correct a height of a bulge.

Further, the present invention provides a production method of the multilayer sheet structure comprising the steps of forming bag portions between a front sheet and a net-like backing sheet prepared on the rear surface thereof by partially joining the front sheet and the backing sheet, and forming bulges on a front surface of the front sheet by inserting paddings through net clearances of the backing sheet into the bag portions.

Further, the present invention provides a backing sheet structure usable to produce a multilayer sheet structure comprising a net-like backing sheet, an adhesive applied along an outline of a pattern on one surface of the backing sheet, and a peelable protection sheet provided on the backing sheet so as to cover the surface of the adhesive.

Further, the present invention provides a front sheet structure usable to produce the multilayer sheet structure comprising the front sheet having a pattern on the surface thereof, adhesive applied along the outline of the pattern on the rear surface of the front sheet, and the peelable protection sheet covering the front surface of the adhesive.

The front sheet is preferably a piece of cloth, a plastic film, or a metal film.

Further, the backing sheet is preferably made of fibers woven into a net-like shape.

Further, the backing sheet is preferably a piece of cloth, plastic film or metal film having a net-like porous shape.

Still further, the joining means is a sewing thread or an adhesive.

Still further, the present invention provides a multilayer sheet structure comprising a front sheet and a plurality of porous sheets laminated on a rear surface of the front sheet, a joining means for joining adjacent sheets in order to form bag portions between the front sheet and the porous sheets or between adjacent porous sheets, and paddings stuffed into the bag portions through pores on the porous sheets so as to be supplied and taken out arbitrarily.

In the above-mentioned configuration, since the adjacent sheets are joined by the joining means so that the bag portions are formed between the front sheet and porous sheets or between adjacent porous sheets, the bag portions wherein paddings can be stuffed are laid out into a multilayer or cubic shape. Accordingly, it is possible to form highly cubic multi-layered bulges on the front sheet or the porous sheets of the rear of the front sheet by stuffing paddings into bag portions on layers. In addition, since paddings can freely be stuffed into bag portions in each of layers through pores on the porous sheets and taken out of the bag portions, heights of bulges on the front sheet and other sheets can easily be adjusted.

Preferably, the porous sheets are colored with different colors. According to this construction, since it is easy to visually check out a layer wherein specific bag portions between sheets are formed even when the porous sheets are joined and fixed in a multilayer shape, paddings can be more easily stuffed into the bag portions or taken out therefrom. For the same purpose, the joining means may also have a different color for each of layers or each of bag portions. Further, the paddings to be stuffed into the bag portions may also have a different color for each of layers or each of bag portions.

As the joining means, a sewing thread and viscous or heat crimping adhesive can be used solely or combined and used if necessary. Further, as the paddings, cotton, wool, cloth, sponge, and rubber-like elastic particles or hard particles can be used. In addition, the front and porous sheets should just have a moderate flexibility, and thus a material such as an woven cloth or a film or sheet made of plastic or metal can be used for the front and porous sheets. Further, the pores on the porous sheets can be preferably extended and contracted using the elasticity of the porous sheets, and shapes of the pores are unlimited and may have a variety of opening shapes, such as circles, ovals, polygons (triangles, squares, hexagons, etc.) or slits having generally a shape of character H, U, or C.

Further, the present invention provides a production method of the multilayer sheet structure wherein a plurality of porous sheets are laminated and fixed on a front sheet by joining adjacent sheets so as to form bag portions between the front sheet and a porous sheet or between adjacent porous sheets. The method is characterized by the steps of stuffing paddings into bag portions through pores on a porous sheet joined on a rear surface of the front sheet, and then laminating and fixing a new porous sheet onto the porous sheet.

According to the above-mentioned production method, each time a porous sheet is joined, paddings are stuffed into bag portions on the outermost layer through pores of the porous sheet. Therefore, it is possible to make a quilt-like multilayer sheet structure comprising multilayer bulges either on the front sheet or porous sheets on the rear side of the front sheet while ensuring easiness of stuffing the paddings.

Further, the present invention provides a production method of the multilayer sheet structure wherein a plurality of porous sheets are laminated and fixed on a rear surface of a front sheet by joining adjacent sheets so as to form bag portions between the front sheet and a porous sheet or between adjacent porous sheets and then paddings are stuffed into bag portions between the front sheet and a porous sheet or between adjacent porous sheets through pores of the porous sheets.

According to the above-mentioned production method, the paddings are stuffed into the bag portions in layers through pores of the porous sheets after the porous sheets are joined and fixed on the rear surface of the front sheet. Therefore, the process of laminating and joining the front sheet or the porous sheets and the process of stuffing paddings into bag portions in layers through pores of the porous sheets can be divided.

Accordingly, since the work of a process can be shared, the multilayer sheet structure can be produced under a high work efficiency.

BRIEF EXPLANATION OF THE DRAWINGS

FIG. 2 is a schematic view showing a configuration example of the backing sheet 12. In this figure, (a) is a plan view of a main part showing the backing sheet and (b) is a cross-sectional view of the backing sheet.

FIG. 3 shows another embodiment of the multilayer sheet structure according to the present invention together with the production method. In this figure, (a) is a schematic perspective view of a main part showing the rear surface of the front sheet, (b) is a cross-sectional view of a main part showing a state before connecting the front sheet and backing sheet, (c) is a cross-sectional view of a main part showing a state wherein the multilayer sheet structure is produced by joining the front sheet and backing sheet, (d) is a cross-sectional view of a main part showing a state wherein the quilt-like structure is completed by stuffing paddings into bag portions in the multilayer sheet structure.

In FIG. 10, (a) and (b) are a front view of the porous sheet, and a cross-sectional view similar to FIG. 7(b), respectively, showing an alternate example of the porous sheet of the first layer shown in FIG. 7.

FIG. 11 is a cross-sectional view similar to FIG. 9(b), showing a structure and production method of the multilayer sheet structure having a front sheet and three layers of porous sheets.

In FIG. 12, (a) and (b) are schematic front views showing configuration examples of porous sheets.

In FIG. 13, (a), (b) and (c) are a schematic front view, a cross-sectional view taken along the line 13b—13b in (a), and a cross-sectional view of the state wherein paddings are stuffed, respectively, showing another configuration example of a porous sheet.

FIG. 14 is a schematic front view of a main part showing an example of multilayer using the porous sheet shown in FIG. 13.

BEST MODE FOR CARRYING OUT THE INVENTION

Figure 1A:
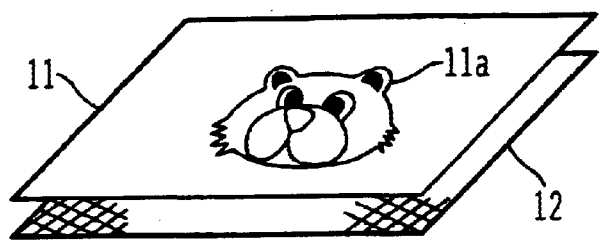
FIG. 1 is an explanatory view showing a multilayer sheet structure and the production method thereof, wherein. In this figure, (a) is a schematic perspective view of a main part showing a state of a front sheet and a backing sheet before being joined, (b) is a cross-sectional view of a main part showing a state wherein the multilayer sheet structure is produced by joining the front sheet and backing sheet, (c) is a cross-sectional view of a main part showing that paddings are being stuffed into the multilayer sheet structure shown in (b), (d) is a cross-sectional view of a main part showing a state wherein paddings are stuffed in the multilayer sheet structure shown in (b), and (e) is a side view of the multilayer sheet structure shown in (d).

Preferred embodiments of the present invention are described below with reference to the drawings.

Referring to FIG. 1, a multilayer sheet structure 10 according to the present invention comprises a front sheet 11 and a net-like backing sheet 12, and the front sheet 11 and the backing sheet 12 are partially joined by a joining means so as to form bag portions 13 therebetween.

The front sheet 11 in this embodiment is generally made of cloth. However, the front sheet can be made of any material having a shape of a sheet, and thus can be formed of, for example, a towel, a textile fabric such as Gobelin, or a thin plastic or metal film.

Further, a shape of the front sheet 11 is not particularly restricted and, for example, may be an outer cloth of clothes such as a shirt, or a personal belonging made of cloth such as towel or handkerchief. The front sheet 11 may also be a cushion, bed cover, table cloth, cloth tapestry, bag, or stuffed toy.

Further, the backing sheet 12 can be any material having a net-like shape, and thus, for example, a cloth or sheet made by weaving fibers, or a porous plastic or metal film can be used as the backing sheet 12.

In the embodiment shown in the figure, sewing threads 14 are used as a joining means. However, adhesives or bonding sheets of a heat seal type can also be used as a joining means. It is preferable to form the joining means (sewing thread 14) along a boundary of an outline or pattern of a figure 11a formed on the front sheet 11.

Figure 1B:
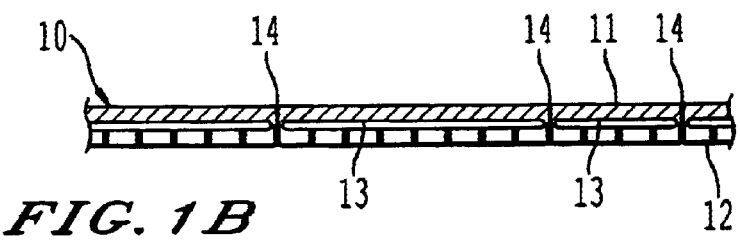
Figure 1C:
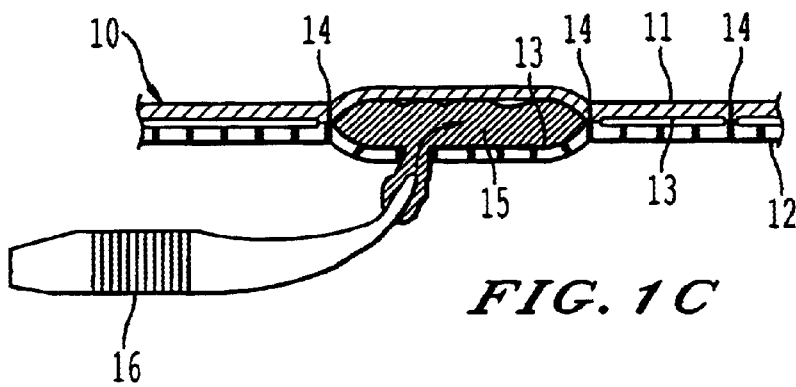

Since the backing sheet 12 of the multilayer sheet structure shown in FIG. 1(b) has a net-like shape, it is possible to easily stuff paddings 15 such as cotton, wool, or sponge into the bag portions 13 through net clearances of the backing sheet 12 without making a crack on the backing sheet 12 by using a pair of tweezers 16 or needle (see FIG. 1(c)). Particularly, since the net clearances of the backing sheet 12 are distributed almost uniformly, a padding can easily be stuffed from a plurality of net clearances even when the bag portions 13 have a complicated outline shape. Further, the padding 15 can be easily stuffed also into the bag portions 13 of small size.

Figure 1D:
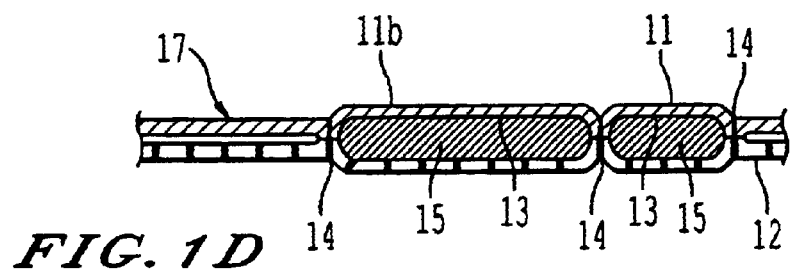
Figure 1E:
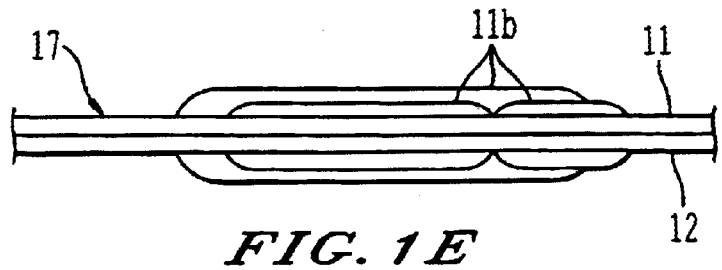

When the padding 15 is stuffed into the bag portions 13, bulges 11b are formed on the surface of the front sheet 11 and the quilt-like structure 17 is completed (see FIG. 1(d) and FIG. 1(e)).

The padding 15 stuffed in the bag portions 13 is retained in the bag portions 13 by meshes of the backing sheet 12, but it is easy to take out the whole or some of the padding 15 out of the bag portions 13 through net clearances. Accordingly, locations where the bulges 11b are formed can be changed and height of the bulges can easily be adjusted any number of times. Even when a figure or pattern on the front sheet 11 is the same as that of others, it is possible to easily obtain the quilt-like structure 17 having a greatly different fine view by changing the locations where the bulges 11b are formed and the height of the bulges.

If the locations where the bulges 11b are formed, and the height of the bulges need not be changed after stuffing the padding 15 into the bag portions 13, an outer or inner surface of the backing sheet 12 may be covered with a protection sheet (not shown) to block the meshes of the backing sheet 12.

The backing sheet 12 shown in FIG. 2 is made of a cloth 18 on which a plurality of pores 18a are formed by uniform distribution on a plane. Sizes of the pores 18a, and distance between the pores can be set appropriately. Further, a thickness or hardness of the backing sheet 12 can also be set appropriately in accordance with a purpose.

In the embodiment shown in FIG. 3, a figure (not shown) which is the same as that shown in FIG. 1(a) is formed on the front surface of the front sheet 21 and adhesives 22 are applied on the rear surface along the outline and boundary of the figure. The process of applying the adhesives 22 can either be carried out in a factory or manually by a user. When the process of applying the adhesives 22 is carried out in a factory, the front sheet 21 can be shipped, transported and sold in a state wherein the surface of the adhesives 22 is protected by a peelable protection sheet (not shown).

A multilayer sheet structure 20 (see FIG. 3(c)) having bag portions 24 can be obtained by sticking the net-like backing sheet 23 with the adhesives 22 onto the rear surface of the front sheet 21 having the aforementioned configuration. Of course, the multilayer sheet structure 20 can be sold as a commodity. Thereafter, a quilt-like multilayer sheet structure 26 (see FIG. 3(d)) having bulges on the surface thereof can be obtained by stuffing paddings 25 such as cotton or the like into bag portions 24 from net clearances of the backing sheet 23 of the multilayer sheet structure 20.

Figure 4A:
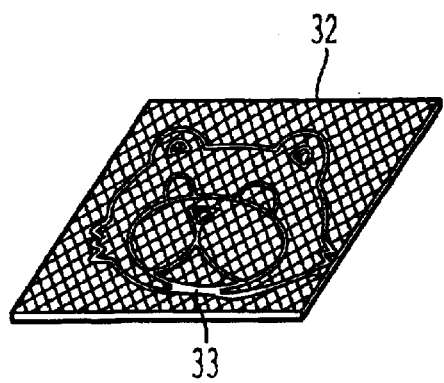
FIG. 4 shows another embodiment of the multilayer sheet structure according to the present invention together with the production method. In this figure, (a) is a schematic perspective view of a main part showing the rear surface of the backing sheet, (b) is a cross-sectional view of a main part showing the backing sheet and protection sheet, (c) is a cross-sectional view of a main part showing a state wherein the multilayer sheet structure is produced by joining the front sheet and backing sheet, and (d) is a cross-sectional view of a main part showing a state wherein the quilt-like structure is completed by stuffing paddings into bag portions in the multilayer sheet structure.
Figure 4B:
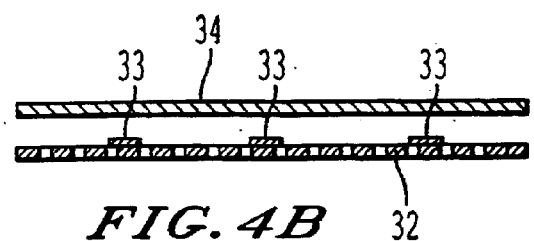

In the embodiment shown in FIG. 4, adhesives 33 are applied on a front surface of a backing sheet 32 so as to draw an outline and boundary of a figure (see FIG. 4(a)). The process of applying the adhesives 33 may be carried out in a factory or manually by a user. When the process of applying the adhesives 33 is carried out in a factory, the backing sheet 32 can be shipped, transported and sold in a state wherein the surface of the adhesive 33 is protected by a peelable protection sheet 34 (see FIG. 4(b)).

Figure 4C:
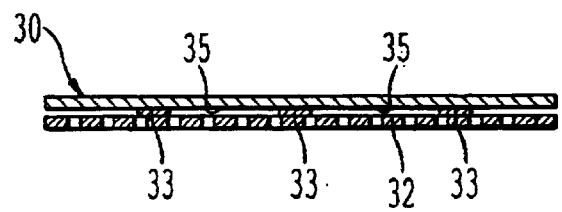
Figure 4D:
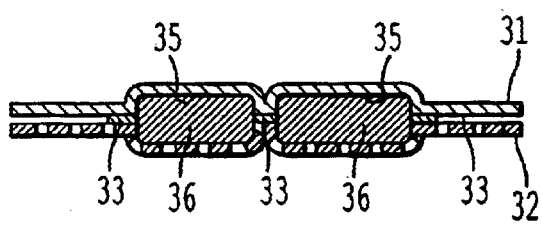

A multilayer sheet structure 30 (see FIG. 4(c)) having bag portions 35 can be obtained by sticking the backing sheet 32 onto the rear surface of a front sheet 31 with the adhesives 33 after the protection sheet 34 is peeled off the backing sheet 32 having the above-mentioned configuration. Of course, the multilayer sheet structure 30 (see FIG. 4(c)) can be sold as a commodity. Thereafter, a quilt-like multilayer sheet structure 37 (see FIG. 4(d)) having bulges on the surface thereof can be obtained by stuffing paddings 36 such as cotton or the like into bag portions 35 from net clearances of the backing sheet 32 of the multilayer sheet structure 30.

Figure 5A:
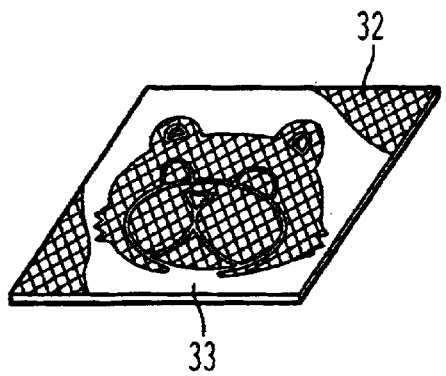
FIG. 5 shows an alternate example of the embodiment shown in FIG. 4. In this Figure, (a) is a partially cut-off schematic perspective view showing the front surface of the backing sheet, (b) is a cross-sectional view of s main part showing the backing sheet and protection sheet, (c) is a cross-sectional view of a main part showing a state wherein the multilayer sheet structure is produced by joining the front sheet and backing sheet, and (d) is a cross-sectional view of a main part showing a status wherein the quilt-like multilayer structure is completed by stuffing paddings into bag portions in the multilayer sheet structure.
Figure 5B:
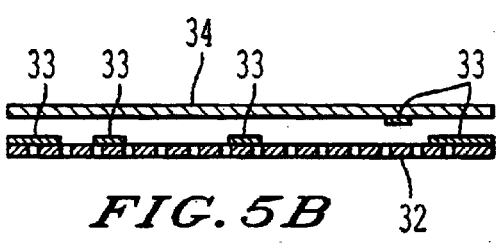

In the embodiment shown in FIG. 5, the adhesive 33 is applied to form a figure on the front surface of the backing sheet 32 as shown in FIG. 5(a) in the same manner as that in the aforementioned embodiments. However, the adhesives 33 are widely applied on the surface of the backing sheet 32 at areas outside the outline of the figure. The process of applying the adhesives 33 may either be carried out in a factory or manually by a user. When the process of applying the adhesives 33 is carried out in a factory, the backing sheet 32 can be shipped, transported and sold in a state wherein the surface of the adhesives 33 is protected by a peelable protection sheet 34 (see FIG. 5(b)).

Figure 5C:
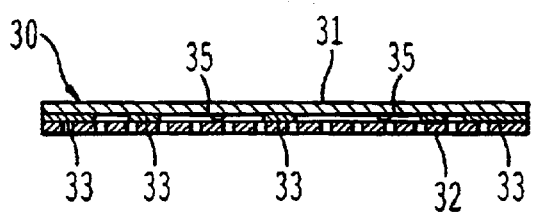
Figure 5D:
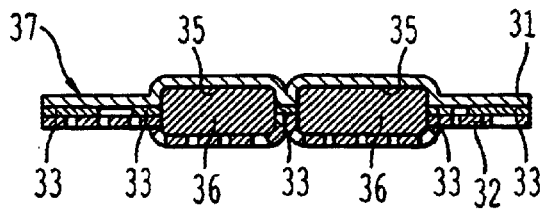
Figure 6A:
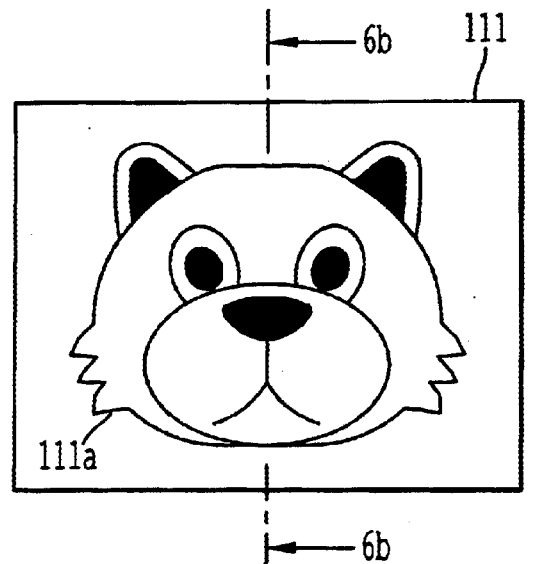
In FIG. 6, (a) and (b) are a front view, and a cross-sectional view taken along a line 6b—6b in (a), respectively, showing a configuration example of the front sheet used for the multilayer sheet structure according to another embodiment of the present invention.
Figure 6B:
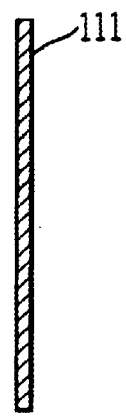

The multilayer sheet structure 30 (see FIG. 5(c)) having a bag portion 35 can be obtained by sticking the backing sheet 32 onto the rear surface of the front sheet 31 with the adhesives 33 after the protection sheet 34 is peeled off the backing sheet 32 having the above-mentioned configuration. In this case, since the adhesives 33 are applied on the entire surface of the backing sheet 32 at areas outside the outline of the figure, the front sheet 31 and the backing sheet 32 can be bonded with each other along the entire periphery thereof. Accordingly, the outer periphery of the backing sheet 32 can be prevented from being peeled off and being hanged down. The multilayer sheet structure 30 produced in such a way can be, of course, sold as a commodity. Thereafter, a quilt-like multilayer sheet structure 37 (see FIG. 5(b)) can be obtained by stuffing a padding 36 such as cotton or the like into the bag portions 35 from net clearances of the backing sheet 32 of the multilayer sheet structure 30.

When the front sheet 31 of the multilayer sheet structure 30 shown in FIGS. 4 and 5 has an unfigured surface, the quilt-like multilayer sheet structure having an unfigured, bulged pattern on the surface of the front sheet can be obtained by stuffing the paddings into the bag portions. In this case, a figure can be painted on the front surface of the front sheet 31 along the bulges on the front surface of the front sheet 31. Further, the adhesives 32 shown in FIGS. 4 and 5 can be applied on a figure (not shown) painted on the backing sheet 32, but adhesives colored by a pigment of a color different from that of the backing sheet 32 can also be applied on the backing sheet 32.

FIGS. 6 to 9 typically show a multilayer sheet structure and the production method thereof according to another embodiment of the present invention. Referring to these Figures, the multilayer sheet structure of this embodiment comprises a front sheet 111 and a plurality of (three in the example shown in the Figures) porous sheets 112, 113 and 114. The front sheet 111 shown in FIG. 6 comprises a piece of cloth wherein a FIG. 111a of a character is printed on the front surface. However, the front sheet 111 can have an unfigured surface. The porous sheets 112, 113, and 114 shown in FIG. 7(a), FIG. 8(a), and FIG. 9(a) are made of net-like woven cloths wherein pores 112a, 113a and 114a of the different size are distributively formed on the entire surfaces thereof.

Figures 7A, 7C:
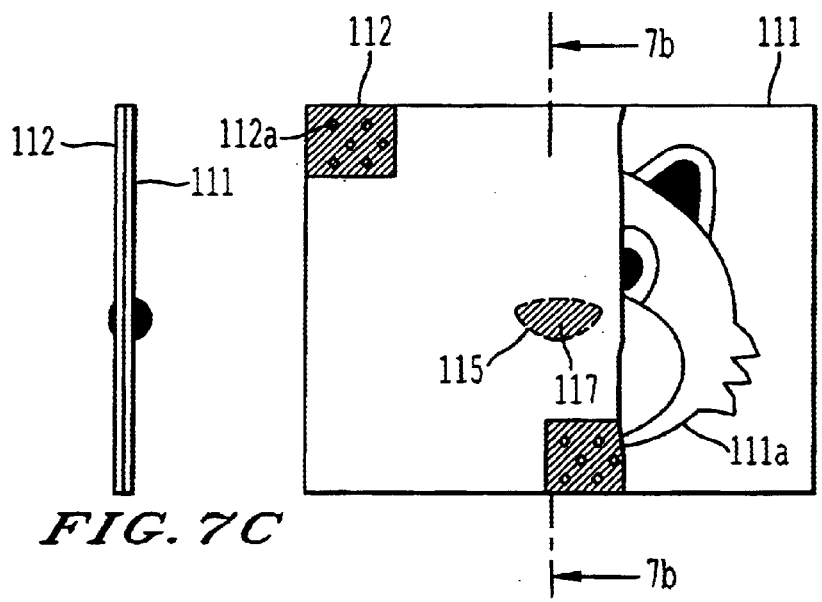
In FIG. 7, (a), (b) and (c) are a partially cut-off schematic front view, a cross-sectional view taken along a line 7b—7b in (a), and a side view, respectively, showing a state wherein a porous sheet of the first layer is laminated on the front sheet shown in FIG. 6 and paddings are stuffed in bag portions in the first layer.
Figure 7B:
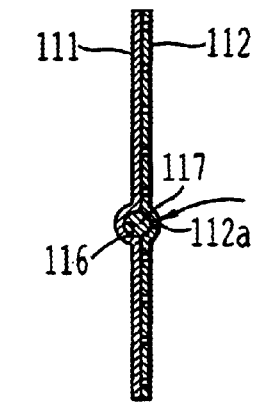

As shown in FIG. 7(a), the front sheet 111 and the first porous sheet 112 are joined (sewed) to each other by means of a sewing thread as a joining means so as to surround the nose tip of the character. Accordingly, a bag portion 116 surrounded by the sewing thread 115 along the outline shape of the nose tip is formed between the front sheet 111 and the first porous sheet 112. As shown in FIG. 7(b), a bulge is formed only on the nose tip portion of the character on the front surface of the front sheet 111 by stuffing cotton 117 as a padding into the bag portion 116 through pores 112a of the porous sheet 112 (see FIG. 7(c)).

Figure 8C:
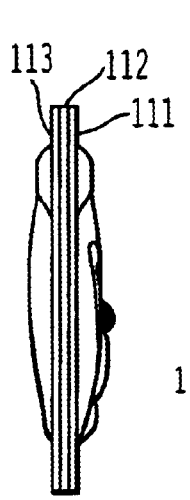
In FIG. 8, (a), (b) and (c) are a partially cut-off schematic front view, a cross-sectional view taken along the line 8b—8b in (a), and a side view, respectively, showing a state wherein a porous sheet of the second layer is laminated on porous sheet shown in FIG. 7 and paddings are stuffed in bag portions in the second layer.
Figure 8A:
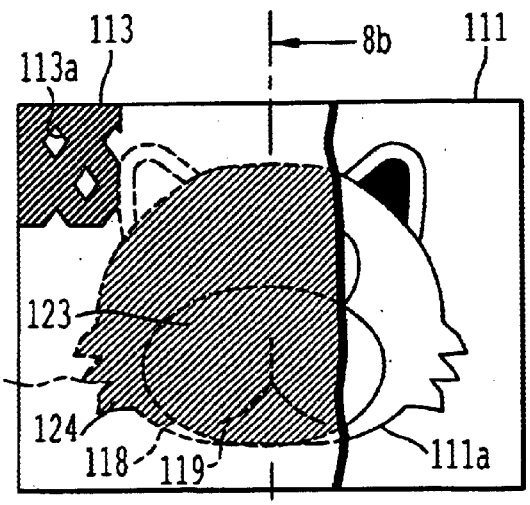
Figure 8B:
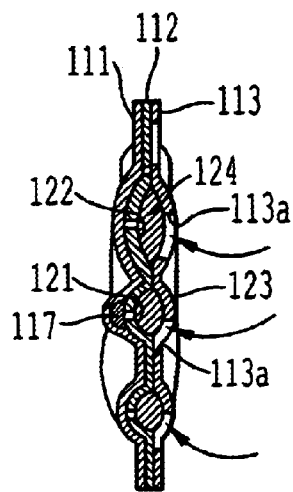

Thereafter, as shown in FIGS. 8(a), 8(b), and 8(c), the second porous sheet 113 is piled up onto the first porous sheet 112. The two porous sheets 112 and 113 are then sewed or joined together with the front sheet 111 by means of a sewing-thread 118 along the outline around the nose, and also sewed by means of a sewing-thread 119 along the outline of the mouth, and also sewed by means of a sewing-thread 120 along the outlines of the face and ears. Accordingly, bag portions 121 and 122 surrounded by these sewing-threads 118, 119, and 120 are formed between the first porous sheet 112 and the second porous sheet 113. Then, pieces of cotton 123 and 124 as paddings are stuffed into bag portions 121 and 122 through pores 113a of the second porous sheet 113.

These two porous sheets 113 and 114 are sewed together with the front sheet 111 and the first porous sheet 112 by means of a sewing-thread 125 along the outline of the face and ears, and also sewed by the sewing-thread 119 along the outline representing the mouth under the nose, and also sewed by the sewing-thread 120 along the outlines of the face and ears. Accordingly, a bag portion 126 surrounded by the sewing-thread 125 is formed between the second porous sheet 113 and the third porous sheet 114. Thereafter, a piece of cotton 127 as a padding is stuffed into the bag portion 126 through pores 114a of the third porous sheet 114.

Figure 9C:
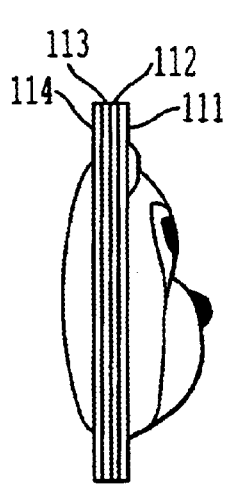
In FIG. 9, (a), (b) and (c) are a partially cut-off schematic front view, a cross-sectional view taken along the line 9b—9b in (a), and a side view, respectively, showing a state wherein a third porous sheet is laminated on the porous sheet shown in FIG. 8 and then paddings are stuffed in bag portions on the third layer.
Figure 9A:
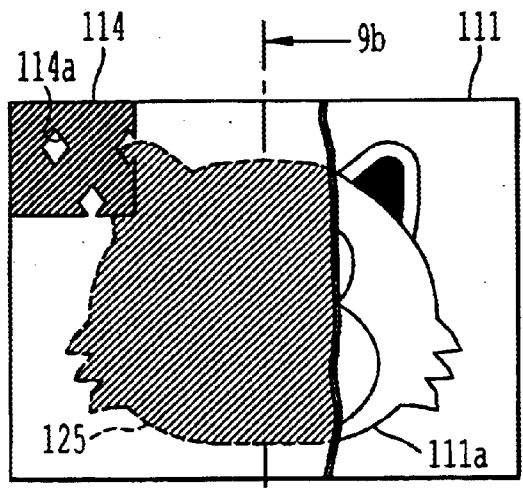
Figure 9B:
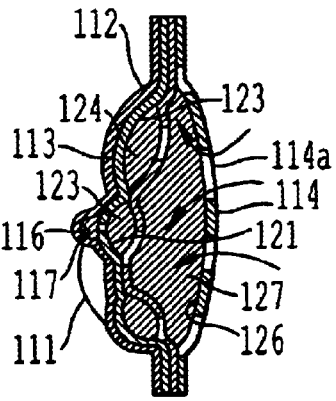

As shown in FIG. 9(b), the bag portions 116, 121, 122, and 126 are formed and disposed in the state of three layers between the corresponding sheets. Further, since the pieces of cotton 117, 123, 124, and 127 are stuffed in the corresponding bag portions, the multilayer sheet structure having rich cubic bulges wherein three layers of bulges are formed on the front surface of the front sheet 111 is completed.

In addition, when the first porous sheet 112 and the second porous sheet 113 shown in FIG. 8(a) are joined, sewing along the outline of the face and ears can be omitted and only the surrounding of the nose can be bulged by stuffing a padding into the surrounding of the nose surrounded by the sewing-thread.

In the above embodiment, the sewing threads 115, 118, 119, 120, and 125 are used as means for joining. Therefore, for example, when the second and third porous sheets 113 and 114 are sewed together, the front sheet 111 and the first porous sheet 112 are sewed together. However, in the case of using adhesives as the joining means, when the second and third porous sheet 113 and 114, for example, are sewed, it is possible to join only these sheets 113 and 114 mutually.

Further, sizes of the pores 112a and 113a of the porous sheets 112 to 114 gradually increase in the above embodiment. However, sizes of the pores can appropriately be set in accordance with sizes of bag portions formed between the sheets.

In FIG. 10, (a) and (b) show an alternate embodiment of the above porous sheet 112. As shown in this Figure, when only a part (e.g., a nose tip of a character) of the figure on the front sheet 111 is bulged, the first porous sheet 112 to be joined to the rear surface of the front sheet 111 can be formed to have a necessary minimum size and shape, and then joined by a joining means such as the sewing-thread 115. Even in this case, it is possible to stuff freely paddings such as cotton 117 into a bag portion between the front sheet 111 and the porous sheet 111 through pores 112a of the porous sheet 112 and take out therefrom.

FIG. 11 shows another method of producing the same multilayer sheet structure as the multilayer sheet structure produced by the method shown in FIGS. 6 to 9. Referring to these Figures, three porous sheets 112, 113, and 114 are laminated and joined onto the rear surface of the front sheet 111 by the same joining means as that shown in FIGS. 6 to 9. However, pieces of cotton 117, 123, 124, and 127 as paddings are stuffed into bag portions 116, 121, 122, and 126 through pores of the porous sheets 112 to 114, as indicated by the arrows A to C, after all of the porous sheets 112 to 114 have been joined onto the rear surface of the front sheet 111. In this production method, since the process wherein a plurality of porous sheets 112 to 114 is joined onto the front sheet 111 and the process wherein paddings such as cotton are stuffed into bag portions 116, 121, 122, and 126 can be separated, the multilayer sheet structure can be produced efficiently, and the products in the middle of manufacture wherein stuffing of paddings such as cotton is uncompleted can be sold to the market as an assembly kit.

FIGS. 12 to 15 show alternate embodiments of pores of a porous sheet, respectively.

The porous sheet 130 shown in FIG. 12(a) is constructed of a net-like woven cloth with roughly twisted threads 130b passing through a pore 130a. Since the threads 130a can easily be deformed as indicated by the sign 130c, paddings (not shown) can be stuffed into bag portions through the pore 130a by widening a space in the threads 130a. Further, since the threads 130b return to the original state of closing the pore 130a after the paddings have been stuffed into the bag portions, the paddings can be prevented from protruding out of the bag portions. Accordingly, the porous sheet 130 is effective to form relatively large pores 130a. As shown in FIG. 12(b), the direction of the threads 130b passing through a pore 130a of the porous sheet 130 can be various modes such as vertical, horizontal, or slant. In the porous sheet 130 of this type, it is preferable to use extremely elastic threads 130b or a weaving method enabling extreme elasticity.

The porous sheet 131 shown in FIGS. 13(a), 13(b), and 13(c) is produced by forming pores 131a comprising H-shaped slits on a sheet material made of plastic or metal. When the porous sheet 131 is joined to a front sheet 132, tongues 131b between slits forming a pore 131a can be bent to widen an opening and a padding can therefore easily be stuffed through the pore 131a as shown in (c) of this Figure. Further, since the tongues 131b return to the original state after stuffing of padding and make the pore 131a smaller into the H-shaped slit, it is possible to prevent protruding of the padding out of the pore 131a. In addition, numeral 133 designates joining portions of the front sheet 132 and the porous sheet 131 in FIGS. 13(b) and 13(c).

FIG. 14 shows an embodiment of joining two piled up porous sheets onto a front sheet. Porous sheets 131 and 131 shown in this Figure have pores 131a having H-shaped slits, and the two porous sheets 131 and 131 are piled up so that locations of the pores 131a are shifted from each other. Even when the locations of the pores 131a are thus shifted, paddings can be stuffed from the pore 131a (not shown) by bending the tongue 131a. Further, since the tongues 131a can prevent the pore 131a from opening wide by mutual interference thereof after stuffing of the paddings, it becomes easy to prevent protruding of the padding out of the pore 131a.

Figure 15A:
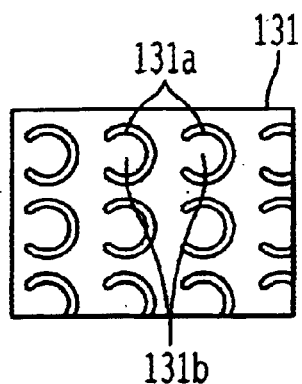
In FIG. 15, (a) and (b) are schematic front views showing other configuration examples of porous sheets.
Figure 15B:
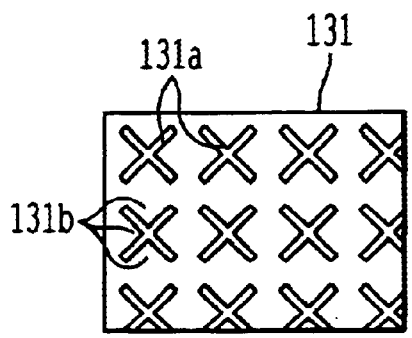

In FIG. 15, (a) and (b) show alternate embodiments of slit pores formed on a porous sheet. A porous sheet 131 shown in FIG. 15(a) has pores consisting of slits 131a having a shape like C. A porous sheet 131 shown in FIG. 15(b) has pores 131a consisting of slits in the form of a cross. In these shapes of the pore, since the pore 131a can be expanded widely by bending tongues 131b sandwiching a slit, paddings (not shown) can easily be stuffed from the pore 131a. Further, since the tongues 131b return to narrow the pore 131a after stuffing the paddings, protrusion of the padding can be prevented.

Figure 16A:
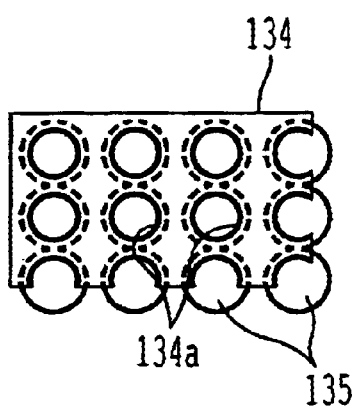
FIG. 16 shows another configuration example of a porous sheet and paddings, wherein (a), (b) and (c) are a front view of a main part, a cross-sectional view of a front sheet and a porous sheet, and a cross-sectional view showing a state wherein paddings are stuffed, respectively.
Figure 16B:
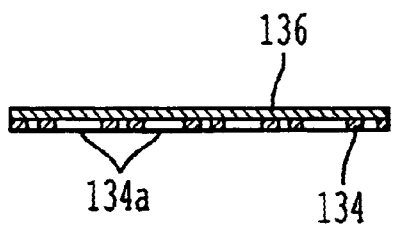
Figure 16C:
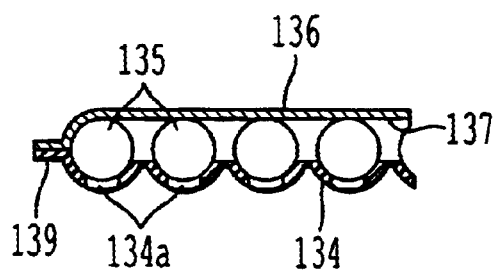

In FIG. 16, (a), (b), and (c) show further alternate embodiments of porous sheets and paddings. Referring to these Figures, a plurality of pores 134a having a circle-like shape are arranged and formed on a porous sheet 134 which is preferably made of an elastic material such as rubber, and a ball-like padding 135 having a larger diameter than that of the pore 134a is stuffed into a bag portion 137 between the porous sheet 134 and a front sheet 136 through the pore 134a. In FIG. 16(c), numeral 138 shows joining portions of the front sheet 136 and the porous sheet 134.

In this embodiment, even when the ball-like padding 135 is a hard material, the ball-like padding 135 can be stuffed into the bag portion 137 by widening the pore 134a. Further, since the pore 134a then returns to the original size, the padding 135 stuffed into the bag portion 137 can be prevented from protruding out of the pore 134a.

Figure 17:
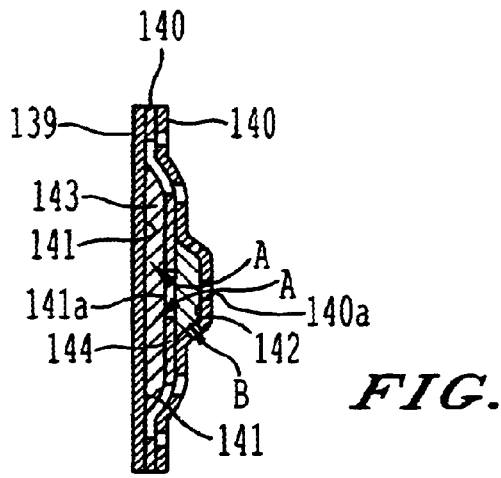
FIG. 17 is a schematic cross-sectional view showing a configuration and production method of the multilayer sheet structure having two layers of porous sheets.

FIG. 17 further shows another embodiment of the present invention. In this embodiment, a plurality (e.g. two) of porous sheets 140 are laminated on the relatively hard front sheet 139 and joined thereto by a joining means such as a sewing-thread or adhesive (not shown) so as to form bag portions 141 and 142.

Accordingly, in the embodiment shown in FIG. 17, when paddings 143 and 144 are stuffed into bag portions 141 and 142 through a pore 140a of a porous sheet 140, the porous sheet 140 can be bulged into a multilayer structure together with obtaining a desired bulge shape on the porous sheet 140 by multilayering bag portions.

Accordingly, by applying the front sheet 139 according to the embodiment shown in FIG. 17 to an outside material of a corset or a pair of brassieres, a pad having an arbitrary adjustable bulge shape can be formed inside the corset or brassieres.

Although the present invention has been explained above with reference to the embodiments shown in the drawings, the present invention is not limited to the modes of the above-mentioned embodiments and various modifications can be added to respective constituent matters within the scope of the invention defined in the claims. For example, outline shapes of the front sheet, backing sheet, and porous sheet, and figures formed on a porous sheet can freely be selected.

INDUSTRIAL APPLICABILITY

The multilayer sheet structure according to the present invention can be applied widely to personal belongings made of cloth such as cloths, towels, handkerchiefs or the like, as well as cushions, bed covers, table cloths, cloth tapestries, bags, stuffed toys, or the like.

What is claimed is:

1. A multilayer sheet structure comprising a front sheet, a backing sheet having a plurality of holes, a joining means for joining partially the front sheet and the backing sheet to form bag portions between the front sheet and the backing sheet, and a plurality of paddings stuffed into said bag portions through said holes, wherein said backing sheet has elasticity so that said holes can be expanded when said paddings are made to sass therethrough.

2. A production method of a multilayer sheet structure comprising the steps of:

joining partially a front sheet and a backing sheet having a plurality of holes and arranged on a rear surface of the front sheet to form bag portions between said front sheet and said backing sheet; and inserting paddings into said bag portions through said holes of said backing sheet to form bulges on a front surface of said front sheet.

3. The multilayer sheet structure according to claim 1, wherein the front sheet is any of a piece of cloth, plastic film or metal film.

4. The multilayer sheet structure according to claim 1, wherein the backing sheet comprises fibers woven in the shape of a net.

5. The multilayer sheet structure according to claim 1, wherein the backing sheet is a piece of cloth, plastic sheet or metal sheet having a porous shape.

6. A multilayer sheet structure comprising:

a front sheet;

a plurality of porous sheets having a plurality of pores and laminated on a rear surface of said front sheet;

a joining means for partially joining the sheets adjacent to each other so that bag portions are formed between the front and porous sheets or between the adjacent porous sheets; and paddings freely stuffed into and taken out of said bag portions through said pores on said porous sheets;

wherein said porous sheets have elasticity so that said pores can be expanded when said paddings are made to pass therethrough.

7. The multilayer sheet structure according to claim 6, wherein the porous sheets are colored with colors different from each other.

8. The multilayer sheet structure claimed in claim 6, wherein the joining means are colored with different colors for the respective layers or respective bag portions.

9. The multilayer sheet structure according to claim 6, wherein the paddings are made of cotton, wool, cloth, sponge, gum elastic particles, or rigid particles.

10. A production method of producing a multilayer sheet wherein a plurality of porous sheets having a plurality of pores are laminated and fixed onto a rear surface of a front sheet by joining the sheets adjacent to each other so as to form bag portions between the front sheet and a porous sheet or between the porous sheets adjacent to each other, said method being characterized in that the paddings are stuffed through said pores of said porous sheets into the bag portions through pores on a porous sheet joined onto the rear surface of the front sheet and then a new porous sheet is laminated and joined on the porous sheet.

11. A production method of producing the multilayer sheet structure wherein a plurality of porous sheets having a plurality of pores are laminated and fixed onto a rear surface of a front sheet by joining the sheets adjacent to each other so as to form bag portions between the front sheet and a porous sheet or between the porous sheets adjacent to each other, and then paddings are stuffed through said pores of said porous sheets into the bag portions between the front sheet and the porous sheet or between the porous sheets adjacent to each other.

12. A multilayer sheet structure comprising a front sheet, a backing sheet having a plurality of holes, a joining means for joining partially the front sheet and the backing sheet to form bag portions between the front sheet and the backing sheet, and a plurality of paddings stuffed into said bag portions through said holes, wherein said paddings have elasticity so that said paddings can be reduced in size when said paddings are made to pass through said holes of said backing sheet.

13. The multilayer sheet structure according to claim 11, wherein the paddings are made of cotton, wool, cloth, sponge, or gum elastic particles.

14. A multilayer sheet structure comprising:

a front sheet;

a plurality of porous sheets having a plurality of pores and laminated on a rear surface of said front sheet;

a joining means for partially joining the sheets adjacent to each other so that bag portions are formed between the front and porous sheets or between the adjacent porous sheets; and paddings freely stuffed into and taken out of said bag portions through said pores on said porous sheets;

wherein said paddings have elasticity so that said paddings can be reduced in size when said paddings are made to pass through said pores of said porous sheets.

15. The multilayer sheet structure according to claim 14, wherein the paddings are made of cotton, wool, cloth, sponge, or gum elastic particles.

* * * * *